L. ILLMER, Jr.
INTERNAL COMBUSTION ENGINE.
APPLICATION FILED MAY 31, 1912.
1,089,133.
Patented Mar. 3, 1914.
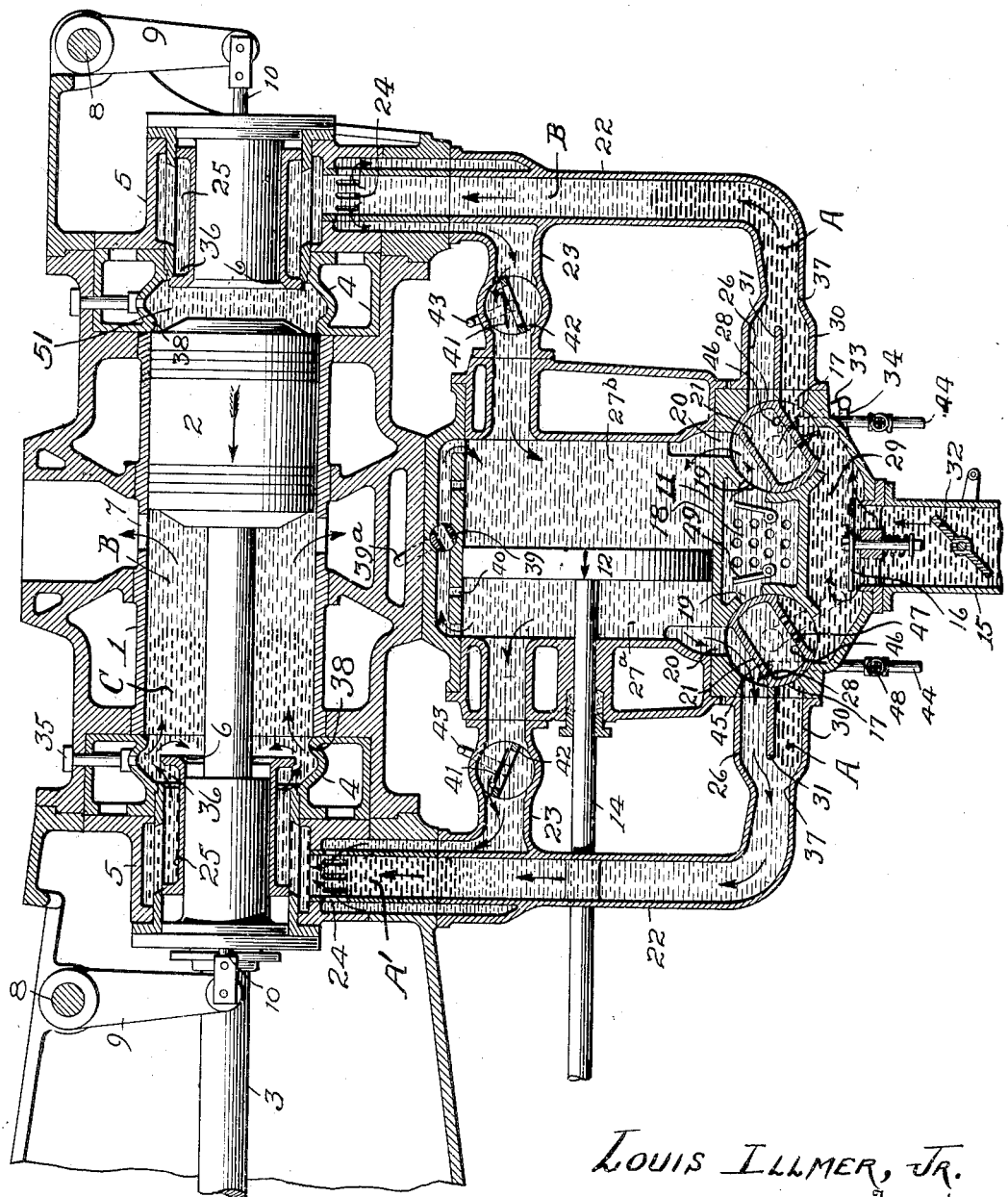
Louis Illmer, Jr.
Inventor
Witnesses

UNITED STATES PATENT OFFICE.

LOUIS ILLMER, JR., OF READING, PENNSYLVANIA, ASSIGNOR TO ILLMER GAS ENGINE COMPANY, A CORPORATION OF DELAWARE.

INTERNAL-COMBUSTION ENGINE.

1,089,133.     Specification of Letters Patent.     Patented Mar. 3, 1914.

Application filed May 31, 1912. Serial No. 700,691.

*To all whom it may concern:*

Be it known that I, LOUIS ILLMER, Jr., citizen of the United States, residing at Reading, in the county of Berks and State of Pennsylvania, have invented certain new and useful Improvements in Internal-Combustion Engines, of which the following is a specification.

This invention relates to a simplified pumping device for charging a double acting power cylinder of a high powered two cycle gas engine of the scavenging type.

By means of a single pump I cause a body of scavenging air to precede the mixture charge and produce substantially the same results in charging the power cylinder as do the separate air and gas pumps commonly used for this purpose. To accomplish this, I employ a double acting pump comprising a single cylinder and a piston, provided with a novel system of independent head end and crank end conduits of similar construction. Each such conduit consists essentially of a gas duct, the inner end of which communicates with the respective pump chamber while the outer end communicates both with said pump chamber and its respective inlet valve of the power cylinder. A control valve is provided for each end of the pump, each of which valves alternately places its respective end of the pump chamber in communication with the air supply and the inner end of its respective gas duct in communication with the gaseous fuel supply, and upon changing its position, closes the separate air and gas supplies and places the inner end of said gas duct in direct communication with the pump chamber, thereby permitting the pump to discharge air simultaneously through both of its communications with the gas duct, while sending forth its charge to the power cylinder. During its suction stroke, the pump simultaneously draws air into the pump chamber and a body of gaseous fuel into the gas duct, which fuel body is confined to the gas duct and not allowed to become excessively diluted with air. A body of air is maintained back of the inlet valve and within the communication leading to the inlet port during the entire period of inlet closure as will hereinafter appear. Upon opening the inlet port, first a body of air is blown into the power cylinder to scavenge the same. At this instant the pump will be on its discharge stroke, and the body of gaseous fuel will thereupon be blown out of the gas duct by means of a following body of air, but before reaching the inlet port, this body of gaseous fuel will meet, and be mixed with, a portion of the air simultaneously discharging from the communication between the pump and the outer end of the gas duct, to form an explosive mixture body, which upon passing into the power cylinder, takes its place therein as a working charge. At the end of the discharge stroke of the pump, the entire conduit system will again have been filled with air. The body of air lying back of the inlet valve is held in this position and the greater portion of this air constitutes the scavenging air for the next following mixture charge. The single pump therefore draws the air and the gaseous fuel from their respective supplies and measures, forms and lets forward into the ends of the power cylinder, alternate bodies of air and a mixture of air and gaseous fuel, so as to scavenge the power cylinder with an air body after each explosion. This scavenging operation is followed by the introduction of the mixture body which is further compressd in the power cylinder, ignited, expanded and finally exhausted in essentially the usual manner of explosive engines.

My invention also involves the use of a large annular inlet valve surrounding the piston rod, which inlet valve co-acts with a special lug formed in the cylinder head wall, causing the incoming charge to maintain the characteristic formation of the bodies of air and gaseous fuel mixture within the power cylinder after passing the inlet valve.

My invention further involves various other features of major or minor importance, such as the means of control, regulation and adjustment of the pump devices, all of which will be fully set forth hereinafter and pointed out in the claims.

Reference is had to the accompanying drawing which illustrates the preferred manner in which the various elements of my invention may be embodied, and which shows a vertical cross-section through the pump and the power cylinder of a double acting two cycle gas engine.

The water jacketed power cylinder 1 is provided with a piston 2, which is mounted on the piston rod 3, one end of which projects through the valve housing 5 and the cylinder head 4, which latter contains the combustion chamber 51. The piston rod 3 is attached to the main cross-head of the engine and is reciprocated by its crank mechanism in the usual manner. The inlet valve 6 surrounds the piston rod and is slidably mounted in parts of the valve housing 5, while the exhaust ports 7 are located intermediate the cylinder ends and are adapted to be overrun by the piston in a manner customary in this type of engine.

As far as the present invention is concerned, the drive for the inlet valves 6 may be of any suitable type, but I prefer to operate these valves mechanically by means of an eccentric mounted on the main shaft, which motion is toggled and transmitted through the rock shaft 8, the double rocker 9 and the push rod 10, which rods are attached to the rear flanges of the inlet valves. Details of such a mechanism are set forth in my co-pending application No. 539,218, filed Jan. 21, 1910.

Within the pump cylinder 11 is provided the pump piston 12, actuated by the piston rod 14 which is attached to a separate crank mechanism (not shown) and driven in synchronism with the power piston movements, as is customary with such attached pumps in this type of engine. As one of the inlet valves 6 opens, the pump piston 12 will be approaching mid position in its discharge stroke, so that the charge will be forced through the open valve into the power cylinder. The pump is supplied with gaseous fuel through the gas supply pipe 15, which is under control of the gas check valve 16, whence the gas passes into the gas chamber 29 to feed the gas suction ports 17.

The air supply chamber 18 communicates with the atmosphere through the perforated wall shown, or if desired the air chamber may be connected with the atmosphere by means of a separate pipe, not shown. In the construction shown the air is fed directly into the pump chambers 27ª or 27ᵇ, through the air suction ports 19 and the cylinder ports 20. Each set of air suction ports 19 and gas suction ports 17 is controlled by one of the common pump valves 21. These two valves are mechanically operated in synchronism with the pump piston motion through the rocker arms 33 which are tied together by the valve link 34. The pump valve 21 alternately assumes the two extreme positions shown in the drawing. In one of these positions (shown for the crank and valve), the air and gas supplies are shut off from the pump cylinder by closure of the gas suction port 17 and the air suction port 19, and the cylinder port 20 communicates directly with the discharge port 28. In the reverse position (shown for the head end valve) the suction ports are full open and the discharge port is closed. These valves are preferably to be driven by the same eccentric that operates the inlet valve, all of which is more fully shown in my co-pending application above referred to.

The air and gas movements under control of the valves 21 will be hereinafter described in detail in connection with the operation of the pump.

As stated, the system of conduits employed consists of two separate ducts leading from each end of the pump, one the gas duct 22 and the other the air duct 23, which ducts meet at the mixing ports 24 where they are joined to form the common duct 25 which leads to the inlet port 36 of the power cylinder. The air duct 23 may open directly into the pump chamber 27ª or 27ᵇ, while during the discharge stroke of the pump, the one end of the gas duct 22 communicates with the pump chamber through a passage made up of the air pocket 26, the discharge port 28, and the cylinder port 20. Each pump valve is adapted to control one of the discharge ports 28 simultaneously with the corresponding set of air and gas suction ports 19 and 17 respectively. The arrangement of the three ports, 17, 19 and 28 and the operation of the same by means of a single valve, permits the use of a small number of moving parts and constitutes an important feature of my present invention. The gas ducts 22 also communicate with the gas supply pipe 15 through a passage made up of the gas chamber 29, the gas suction port 17 and the gas pocket 30. A separating wall 31 is located between the air pocket 26 and the gas pocket 30 the purpose of which will be hereinafter set forth.

The governor throttle valve 32 controls the gas supply and serves to regulate the engine by connecting the throttle through a suitable linkage with the governor of the engine, (not shown).

Assuming the parts to be in the position shown, and that the two pistons are moving in the direction indicated by arrows, the power piston 2 has just passed its head end dead center position and both the crank and exhaust ports 7 and the crank end inlet valve 6 are open. The working charge in the head end of the power cylinder is under maximum compression and has just been ignited by means of the spark plug 35. The pump piston 12 is on its downward stroke, which rarefies the air in the head end parts of the pump, including the pump chamber 27ᵇ, the air duct 23 and the gas duct 22 and up to the gas suction port 17. The latter port having been opened shortly after the reversal of the pump piston, a body of gaseous fuel will therefore be flowing from the gas chamber 29, through the gas pocket 30 and into the gas duct 22, as illustrated by the lines "A" which indicate the flow of a gas body.

It is intended that the ducts and the valve ports be designed to permit the forward movement of the stratified bodies of air and of gas without excessive intermingling. As the body of gas is being sucked into the gas duct 22, the air previously lying ahead of the gas will therefore be pushed forward. The gas duct has a sufficiently large capacity to hold the full gas charge required by the power cylinder, and, at the end of the suction stroke of the pump the fully entered body of gas may extend up to the mixing ports 24. At light loads, the governor throttle valve 32 causes a smaller body of gas to be sucked into the gas duct 22 and for this condition the gas body will not extend up to the mixing ports, and a body of air will lie between said ports and the gas body, as indicated by the letter "B". As the above operations take place in the gas duct, air is being simultaneously sucked directly into the pump chamber 27$^b$ through the cylinder port 20 and the air suction port 19, as indicated by the arrows. The air described as being pushed ahead of the body of gas entering the duct 22, also flows, through the communicating branch 23 toward the pump chamber 27$^b$, whereby the pump chamber is fed by both the air and the gas suction valves but air alone enters the said chamber. The air lying behind the closed inlet valve in the common duct 25 is not displaced by the sucking action of the pump but remains in position to be introduced into the power cylinder as scavenging air ahead of the following mixture body. Upon the reversal of the pump piston 12, the pump valves 21 promptly change their positions, the head end valve closing the air and gas suction ports 19 and 17 respectively and opening the discharge port 28. The above described suction operations are then repeated in the crank end of the pump.

During the first portion of the pump discharge stroke the charge is compressed so as to be ready to flow into the power cylinder at the instant the inlet valve opens. At or about mid stroke of the pump, the head end exhaust port 7 and the head end inlet valve 6 open. Prior to this time, the head end air discharge port 28 will have partially opened and the inlet opening alone times the forward flow of the bodies of air and of mixture into the power cylinder. Thereupon the continued action of the pump piston forces the air out of the pump chamber 27$^b$ which causes a body of air to be discharged from both the air duct 23 and the gas duct 22. The movement of this air forces into the power cylinder, first, the body of air lying in the common duct 25 which constitutes the initial portion of the scavenging air. The body of air flowing out of the pump chamber and into the gas duct 22, passes through the discharge port 28 and the air pocket 26.

The air pocket permits eddying of the air after it leaves the partially contracted discharge port 28 and thus spreads the air over the entire area of the air pocket 26 before it discharges into the neck 37. The gas will then be pushed out of the gas duct 22 in a body without excessive intermingling with the air. At this instant, air is being discharged simultaneously through the air duct 23 and any air that may have been previously lying in the gas duct between the gas body and the mixing ports 24 will serve as scavenging air in addition to that described as having been blown out of the common duct 25. As the gas body reaches the mixing ports 24, it will be thoroughly mixed with the air that is being discharged from the air duct 23 and so forms the explosive mixture body. The last named body passes into and through the common duct 25 and flows past the open inlet valve 6 and takes its place in the power cylinder as a working charge. The body of explosive mixture thus formed and introduced, is followed by the remaining air still being discharged from the pump chamber, which body of air flows into the common duct 25, pushing forward and ahead of it, the body of explosive mixture, until the latter is entirely entered into the power cylinder. At the end of the discharge stroke of the pump, which coincides approximately with the instant of inlet closure, air alone lies behind the inlet valve 6 in the common duct 25, the gas duct, and all of the other pump parts except the gas pocket 30. As the pump piston again reverses its stroke, operations similar to those for the head end charging just described, are brought about in the crank end of the pump and in the crank end of the power cylinder. The charging operation of the crank end of the power cylinder is illustrated in the drawing in which the remaining portion of the gas body yet to be mixed with air is indicated by the letter A' and is shown for the instant when a considerable portion of the mixture body is already formed. Such mixture is indicated by the letter C, a considerable portion of which is shown as having already entered the power cylinder and as pushing ahead of it the body of scavenging air B that preceded it. The mixture body extends back to the mixture ports where it is formed.

It will be seen therefore, that by means of my invention involving the use of a single, double acting pump fitted with only two valves, I supply the power cylinder of a double acting gas engine with alternate bodies of scavenging air and of explosive mixture, which pass successively into the power cylinder, the scavenging air cooling and cleansing the cylinder and the mixture body entering as a working charge; and this in turn followed by a second body of air, of which a minor portion may be allowed to follow the mixture body into the power cylinder while the major portion of the said air body is made to lie back of the inlet valve, isolating it from the gas supply. These results are obtained by sucking air into the pump cylinder and at the same time sucking a body of gaseous fuel into a duct and subsequently blowing the body of gas out of said duct by means of a body of air and converting the said gas body into a mixture body by simultaneously blowing air into the gas body as it passes on its way toward the power cylinder.

If desired a mixture body of air and gas may be sucked into the gas duct 22 instead of working with a stratified gas body, in which event the mixture would be formed at an earlier period in the engine cycle and the amount of explosive mixture stored in the ducts would thereby be increased. In such modified operation, the air discharge through the air duct 23 would have to be greatly reduced or made to cease entirely. It may also be pointed out that the double ducts, i. e.: the air duct 23 and the gas duct 22, leading from the pump, may separately extend up to the inlet valve without forming the common duct 25 at all. At the end of the suction stroke a body of air will then lie in the gas duct ahead of the body of gas and the explosive mixture will be formed at the inlet valve, in which case the mixing ports 24 may be eliminated. The action of the single pump however remains substantially the same as in the design shown in the drawing. Since the gas body begins to enter the gas duct 22 before the gas suction port 17 has fully opened, a supplementary duct or gas pocket 30 is provided between said port and the stratifying neck 37. The object of the gas pocket 30 is to give the gas an opportunity to eddy or whirl so as to cause the gas to spread before discharging from this pocket into the stratifying neck 37. As the gas body is sucked into the gas duct 22, it will then push forward the body of air lying ahead of it without causing excessive intermingling. The gas pocket 30 will at all times hold a relatively small volume of gas and during the discharge stroke of the pump this gas is trapped and held in place until the gas suction port 17 again opens. The separating wall 31 performs the additional function of a baffle and causes the gas to flow directly into the stratifying neck 37 as it discharges from the pocket 30. It may be pointed out that should said gas body pick up some of the air during the process of stratification, it will not materially affect the efficiency of the engine unless the mixture body is allowed to become excessively diluted with air, in which case it would retard the rate of ignition. In the design of the ducts, the purpose is to eliminate pockets and the like so as to best facilitate the described stratification. The bodies of scavenging air and of explosive mixture are necessarily charged into the power cylinder at a rather high velocity in order to complete this operation within the short time allowed for the charging period when running at the usual speed for this type of engine. To prevent a portion of the mixture body from flowing completely through the power cylinder and out of the exhaust ports, resulting in both waste of gas and a failure to get the cylinder full of mixture, the inlet opening should be of liberal dimensions and the major portion of the kinetic energy attained by the charge in flowing by the inlet valve should be absorbed before the charge has passed any considerable distance into the power cylinder. I accomplish this end by having the inlet valve 6 surround the piston rod 3 and causing the charge to flow in the common duct 25 which gives the charge a direction of flow parallel with the horizontal axis of the power cylinder before reaching the annular inlet port 36. I also provide a wall or eddying lug 38, surrounding the head of the inlet valve 6 and formed in the cylinder head 4, which lug is adapted to intercept the direct flow of the charge toward the exhaust ports and to co-act with the inlet valve in the following manner:— As the mixture charge enters the cylinder (indicated in the drawing by the letter C) it flows past the inlet valve, which, when open, acts as a baffle to spread the gas mixture into a hollow cone-like or funnel shaped formation. The mixture body thus discharged, strikes the surrounding eddy lug 38 approximately normally to its direction of flow. Such action impedes the flow immediately after leaving the inlet valve and results in the creation of intense eddy currents which cause the mixture to whirl and lose a considerable portion of its high initial velocity. The resulting reduction of velocity causes the mixture body to spread and to drive out the scavenging air ahead, in a body, and permits the cylinder to be almost entirely filled with the mixture body. In this manner the formation of alternate bodies of scavenging air and of explosive mixture may be maintained within the power cylinder after they have passed the inlet valve.

In order to control the position of the mixture body as it takes its place within the power cylinder, I provide a pump by-pass valve 39 through which the pressure side is placed in direct communication with the suction side of the pump. This by-pass may be adjusted by hand while running, by means of a lever 39$^a$ with which the effective discharge of the pump may be varied at will. This adjustment in turn fixes the final position of the mixture body within the power cylinder previous to the piston compression period. By means of the pump by-pass valve 39, the adjustment of the said succeeding body of air is under direct control and this, in connection with the limited discharge capacity of the pump, permits the use of the described alternate bodies of scavenging air and of a mixture of air and gas, without the possibility of at any time blowing the mixture body out of the power cylinder by an excessively large succeeding air body. This feature is especially important in starting the engine or while running at variable speeds. In addition to the above described control, the pressure side of the pump is further placed in communication with the suction side by means of the timed piston by-pass ports 40, which are overrun as the pump piston 12 approaches its dead center position and at which time only the stated communication will be established. At this instant the inlet valve 6 will have closed and the air in the gas duct 22, the air ducts 23 and the common duct 25 will be relieved of their pressure through the piston by-pass port 40. This obviates the necessity of providing the additional piston displacement that would otherwise be required to expand to atmosphere, the air confined in the large clearance space. By means of the ports 40 it is also possible to maintain a more uniform suction capacity of the pump through wide variations in the engine speed.

Each air duct 23 is provided with an air check valve 41 mounted on a valve seat 42, which is capable of being rotated or otherwise adjustably set, by means of the lever 43. The valve 41 opens inwardly toward the pump chamber, so that when gas is being sucked into the gas duct 22, the air check valve 40 opens freely. By proper adjustment and locking of the lever 43, the valve seat 42 is so set as to allow a predetermined area of discharge. Accordingly a relatively large body of gas may at all times be sucked into the gas duct without being perceptibly affected by any throttling adjustment made for the air discharge through the duct 23. As the air duct discharge is restricted, a larger portion of the pump chamber discharge can be made to pass through the gas duct 23. Thus, if desired, the gas may be blown out of the duct 22 more or less rapidly, while the air discharged through the duct 23 will be correspondingly reduced in amount. The adjustment of the valve seat 42 therefore permits a variation in the ratio of air to gas in the formation of the mixture body to meet variations in the calorific value of the gaseous fuel. At the same time that the valve seat 42 is made to throttle the air duct discharge, it is expedient to correspondingly open the setting of the by-pass valve 39 so as not to shift the mixture body into the power cylinder. If preferred, a properly timed mechanically operated valve may be substituted for the automatic check valve 41.

Another mode of changing the ratio of air to gas, which however does not require the adjustment of the valve 39, is shown in the drawing. The pipe 44 supplies atmospheric air or other diluting gaseous fluids to the port 45 (shown dotted) located in the cover plate of the pump valve 21. This valve is made up of a body portion, cast hollow, and is provided with end walls closing this hollow space. One of said walls carries a port 46, which registers with a port 45 during the suction period of the pump. Communication is established between the hollow portion of the valve body and the gas suction port 17 through a series of small holes 47, so that diluting air may be sucked through the hollow body of the valve 21 and mixed with the gas supply at the time that the latter is entering the gas pocket 30. During the discharge stroke of the pump, the port 45 is not allowed to register with the port 46. By adjusting the diluting valves 48 the ratio of air to gas in the mixture body formed at the mixing ports 24 may be varied at will.

For the purpose of balancing or otherwise independently adjusting the relative amount of mixture body charged into either end of the power cylinder, I provide separate air throttle valves 49 for each of the air suction ports 19. These valves may be adjusted from the outside while running, by any convenient means, not shown. It will be seen that the throttling of either of the air suction ports 19 will indirectly cause a relatively large portion of gas to be sucked through the corresponding gas suction port 17 and in this manner the mean effective pressure in one end of the power cylinder may be changed with respect to the other.

The gas supply pipe 15 is provided with an automatic gas check valve 16, which may be placed in any convenient part of the gas supply line. The valve 16 prevents flooding the gas ducts and the pump chamber with gas when starting the engine, which starting may be done, as usual, with compressed air. The valve 16 is comparatively light in construction, though sufficiently heavy to prevent the gas pressure alone from lifting the valve perceptibly, but the additional rarefaction produced when starting the pump, allows the proper amount of gas to pass into the duct 22 without however sucking gas into the pump chamber.

The particular construction illustrated is subject to various modifications without departing from the spirit of or narrowing the scope of the present invention, for instance, the gas suction port 17 may be located to feed the duct 22 at any point between the mixing port 24 and the pump chamber, and, by the use of proper check valve or valves, the gas may be prevented from sucking directly into the pump chamber, thus accomplishing the same results. Also, the air suction port 19 may be made to feed into any part of the duct 23, and furthermore the discharge valve may be eliminated by suitably rearranging the point of admission of the gas into the gas duct.

What I claim is:—

1. In an internal combustion engine of the scavenging type having a power cylinder with controlled inlet and exhaust ports, a charging pump comprising a single cylinder and a piston, a gas duct one end of which communicates with the pump and the other end with both the pump and the power cylinder, separate supplies of air and gaseous fuel, means for admitting air to the pump and a body of gaseous fuel into the gas duct, the pump during its compression stroke serving to blow said gaseous fuel body out of the gas duct and into the power cylinder by means of a body of air, a portion of which body of air is held back of the inlet valve during the entire period of inlet closure.

2. In an internal combustion engine of the scavenging type having a power cylinder with controlled inlet and exhaust ports, a charging pump comprising a single cylinder and a piston, a gas duct one end of which communicates with the pump and the other end with both the pump and the power cylinder, separate supplies of air and gaseous fuel, means admitting air to the pump and a body of gaseous fuel to the gas duct, said pump during its compression stroke discharging air through both of its communications with the duct to blow said gaseous fuel body out of the duct and mix it with air and to enter the mixture body thus formed into the power cylinder, and means for controlling the ratio of air to gas in said mixture body.

3. In an internal combustion engine of the scavenging type, having a power cylinder with controlled inlet and exhaust ports, a charging pump comprising a single cylinder and a piston, a gas duct and an air duct, each establishing communication with the pump and a common duct discharging to the inlet port, separate supplies of air and gaseous fuel, means for admitting air to the pump and a body of gaseous fuel into the gas duct, said pump during its compression stroke discharging air through both the air and the gas ducts simultaneously to blow said gaseous fuel body out of the gas duct and means converting said air and gas into an explosive mixture body prior to entering the same into the power cylinder.

4. In an internal combustion engine of the scavenging type having a power cylinder with controlled inlet and exhaust ports, a charging pump comprising a single cylinder and a piston, a gas duct one end of which communicates with the pump and the other end with both the pump and the power cylinder, separate supplies of air and gaseous fuel, a valve admitting air to the pump cylinder and a body of gaseous fuel into the gas duct and commanding one of the communications between the pump and the duct, the pump during its compression stroke discharging air through both of its communications with the duct to blow said gaseous fuel body out of the duct and mix it with air and to enter the explosive mixture thus formed, into the power cylinder, by means of a body of air, a portion of which body of air is held back of the inlet valve during the entire period of inlet closure.

5. In an internal combustion engine of the scavenging type having a power cylinder with controlled inlet and exhaust ports, a charging pump comprising a single cylinder and a piston, a gas duct of which its inner end communicates with the pump and its outer end communicates with both the pump and the power cylinder, an air and a gaseous fuel supply means, a valve arranged alternately to place the pump cylinder in communication with the air supply to admit air and to place the inner end of the gas duct in communication with the gas supply to admit a body of gaseous fuel, and upon changing its position, to close the air and gas supplies and place the inner end of the gas duct in direct communication with the pump cylinder to blow said body of gaseous fuel out of the duct and into the power cylinder.

6. In an internal combustion engine of the scavenging type having a power cylinder with controlled inlet and exhaust ports, a charging pump comprising a single cylinder and a piston, a gas duct one end of which communicates with the pump and the other end with both the pump and the power cylinder, separate supplies of air and gaseous fuel, means for admitting air to the pump and a body of gaseous fuel to the duct, the pump during its discharge stroke serving to blow the body of gaseous fuel out of the duct and mix it with air and to send forth into the power cylinder, first a body of scavenging air, then a mixture body of air and gaseous fuel and then a second body of air, and means adjustably controlling the amount of air that is allowed to follow the mixture body into the power cylinder prior to inlet closure.

7. In an internal combustion engine of the scavenging type, having a power cylinder with controlled inlet and exhaust ports, control means including an air measuring device of predetermined volumetric capacity by which bodies of air and of explosive mixture are measured and sent forward alternately into the power cylinder, the movements of said bodies being so timed that upon opening of the inlet and exhaust ports, a body of air will first be blown into the power cylinder to scavenge the same, then a mixture body of air and fuel, followed, prior to inlet closure by a second body of air discharged from and limited by the predetermined volume of said measuring device, a portion of said second body of air being held back of the inlet valve during the entire period of inlet closure.

8. In an internal combustion engine having a power cylinder with controlled inlet and exhaust ports, a pump comprising a single cylinder and a piston for charging alternate bodies of scavenging air and explosive mixture into the power cylinder, separate supplies of air and gaseous fuel, a gas duct one end of which communicates with the pump and the other end with both the pump and the power cylinder, means admitting air into the pump, and means, including a gas pocket, for admitting gaseous fuel into the gas duct, in the manner and for the purpose set forth.

9. In an internal combustion engine having a power cylinder with controlled inlet and exhaust ports, a pump comprising a single cylinder and a piston for charging alternate bodies of scavenging air and explosive mixture into the power cylinder, separate supplies of air and gaseous fuel, a gas duct one end of which communicates with the pump and the other end with both the pump and the power cylinder, means for admitting air into the pump and a body of gaseous fuel into the gas duct, and an automatic check valve controlling the gas supply for the purpose set forth.

10. In an internal combustion engine of the scavenging type having a power cylinder with controlled inlet and exhaust ports, a charging pump comprising a single cylinder and a piston, a gas duct one end of which communicates with the pump and the other end with both the pump and the power cylinder, separate supplies of air and gaseous fuel, means for admitting air to the pump and a body of gaseous fuel to the duct, the pump during its discharge stroke serving to blow the body of gaseous fuel out of the duct and into the power cylinder by means of a body of air, and a bypass means in the pump for relieving the pressure in the duct as the pump piston approaches the end of its discharge stroke.

11. In an internal combustion engine having a power cylinder with controlled inlet and exhaust ports, a pump comprising a single cylinder and a piston for charging alternate bodies of scavenging air and explosive mixture into the power cylinder, separate supplies of air and gaseous fuel, a gas duct one end of which communicates with the pump and the other end with both the pump and the power cylinder, means for admitting air into the pump and a body of gaseous fuel into the gas duct, and an adjustable throttle means, in the air supply to the pump, for regulating the suction influence of the pump while in action.

In testimony whereof I affix my signature in presence of two witnesses.

LOUIS ILLMER, Jr.

Witnesses:
 Ed. A. Kelly,
 Clara E. Young.